(12) United States Patent  (10) Patent No.: US 8,897,559 B2
Roux  (45) Date of Patent: *Nov. 25, 2014

(54) METHOD, SYSTEM AND APPARATUS MODIFY PIXEL COLOR SATURATION LEVEL

(71) Applicant: STMicroelectronics (Grenoble 2) SAS, Grenoble (FR)

(72) Inventor: Nicolas Roux, Saint-Jean de Moirans (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 98 days.

This patent is subject to a terminal disclaimer.

(21) Appl. No.: 13/624,613

(22) Filed: Sep. 21, 2012

(65) Prior Publication Data

US 2013/0071026 A1  Mar. 21, 2013

(30) Foreign Application Priority Data

Sep. 21, 2011 (FR) ........................................ 1158374
Sep. 21, 2011 (FR) ........................................ 1158375

(51) Int. Cl.
*G06K 9/00* (2006.01)
*G06T 11/00* (2006.01)
*G09G 5/02* (2006.01)
*G06K 9/34* (2006.01)

(52) U.S. Cl.
CPC .............. *G09G 5/02* (2013.01); *G09G 2340/06* (2013.01); *G06T 11/001* (2013.01)

USPC ............................................................ 382/167

(58) Field of Classification Search
CPC ............................. G09G 5/02; G09G 2340/06
USPC .......... 382/162, 164, 165, 167; 348/580, 581, 348/583, 649, 651, 739, E05.133; 345/589, 345/690

See application file for complete search history.

(56) References Cited

U.S. PATENT DOCUMENTS

| 7,746,411 | B1 | 6/2010 | Balram et al. | |
| 8,576,261 | B2 * | 11/2013 | Yoshida et al. | 345/690 |
| 2006/0197774 | A1 * | 9/2006 | Wang et al. | 345/589 |
| 2008/0252794 | A1 * | 10/2008 | Su et al. | 348/739 |
| 2013/0069972 | A1 * | 3/2013 | Roux | 345/593 |
| 2013/0071026 | A1 * | 3/2013 | Roux | 382/167 |

FOREIGN PATENT DOCUMENTS

| EP | 0 677 972 A2 | 10/1985 |
| EP | 1 383 341 A2 | 1/2004 |
| EP | 1 480 468 A2 | 11/2004 |

* cited by examiner

*Primary Examiner* — Amir Alavi
(74) *Attorney, Agent, or Firm* — Seed IP Law Group PLLC

(57) ABSTRACT

A method for performing a modification of the color saturation of at least one pixel of an image involving: determining, based on pixel values of a first pixel, at least one of a color saturation value, luminance value and hue value corresponding to said first pixel; determining, based on said at least one value, a saturation factor; and modifying the color saturation level of said first pixel based on said saturation factor.

47 Claims, 4 Drawing Sheets

METHOD, SYSTEM AND APPARATUS MODIFY PIXEL COLOR SATURATION LEVEL

BACKGROUND

1. Technical Field

The present disclosure relates to a method and apparatus for modifying the color saturation of one or more pixels of an image.

2. Description of the Related Art

There are various color models that can be used to represent the pixels of a color image. The RGB (red, green, blue) color model comprises three values R, G and B for each pixel representing respectively an intensity of red, green and blue light. Such a representation corresponds closely to the display of images on displays such as cathode ray tubes (CRT) and liquid crystal displays (LCDs). For storage and processing purposes, the RGB format is not optimum, and thus different color models may be used, such as the YUV color model or variants thereof, according to which one value Y represents luminance of the pixel, and two values UV represent the chrominance. Furthermore, the HSV (Hue, Saturation, Value) color model comprises one color value H representing the hue, a saturation value S, and a value V that represents luminance.

A user may define a desired color saturation increase to be applied to the pixels of an image. However, it is easy to over saturate an image, leading to a degradation of the image quality. A problem is the tools that currently exist for modifying color saturation in an image do not adequately assist a user in selecting the appropriate and safe color saturation.

BRIEF SUMMARY

An embodiment of the present disclosure facilitates at least partially addressing one or more problems in the prior art.

According to one aspect, there is provided a method for performing a modification of the color saturation of at least one pixel of an image comprising: determining, based on pixel values of a first pixel, at least one of a color saturation value, luminance value and hue value corresponding to said first pixel; determining, based on said at least one value, a saturation factor; and modifying the color saturation level of said first pixel based on said saturation factor.

According to one embodiment, said step of determining said at least one value comprises determining, based on values of said first pixel, at least two of a color saturation value, luminance value and hue value corresponding to said first pixel, and said step of determining said saturation factor comprises determining a first maximum saturation factor based on a first of said at least two values, determining a second maximum saturation factor based on a second of said at least two values, and selecting the lowest of said first and second maximum saturation factors.

According to an embodiment, said step of determining said at least one value comprises determining, based on values of said first pixel, a color saturation value, a luminance value and a hue value corresponding to said first pixel, and said step of determining said saturation factor comprises determining a first maximum saturation factor based on said color saturation value, determining a second maximum saturation factor based on said hue value, and determining a third maximum saturation factor based on said luminance value, and selecting the lowest of said first, second and third maximum saturation factors.

According to an embodiment, said saturation factor is determined by a lookup table.

According to an embodiment, said at least one of a color saturation value, luminance value and hue value is a color saturation value, and, if said color saturation value is lower than a first threshold, said saturation factor indicates a decrease in the color saturation of said pixel, and if said color saturation value is higher than said first threshold, said saturation factor indicates an increase in the color saturation of said pixel.

According to an embodiment, the method further comprises: calculating a luminance value based on RGB values of said first pixel; calculating a first maximum increase of said color saturation based on the highest of said RGB values and on said luminance value; and calculating a second maximum increase of said color saturation based on the lowest of said RGB values and on said luminance value; wherein modifying the color saturation level of said first pixel comprises modifying said color saturation level based on the minimum of said first and second maximum increases and said saturation factor.

According to an embodiment, said pixel values of said first pixel are RGB values, and modifying said color saturation comprises increasing the distance between a maximum and a minimum of said RGB values.

According to an embodiment, modifying said color saturation comprises performing the following operation:

$$b' = a - (a-b) \cdot SF_p'$$

$$c' = a - (a-c) \cdot SF_p'$$

where a, b and c are respectively the highest, intermediate and lowest of said RGB values, b' is the new value of said intermediate RGB value, c' is the new value of said lowest RGB value, and $SF_p'$ is said saturation factor.

According to an embodiment, the method further comprises calculating a maximum saturation $SF_{max}$ by performing the following operation: $SF_{max} = a/(a-c)$, wherein the color saturation of said pixel is modified by applying the lowest of said saturation factor and said maximum saturation.

According to an embodiment, the method comprises, prior to performing said color saturation modification, performing a first color saturation modification of said first pixel by performing the following matrix calculation:

$$\begin{bmatrix} R'_p \\ G'_p \\ B'_p \end{bmatrix} = \begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification.

According to an embodiment, the method further comprises calculating the saturation factor of said first color saturation modification by: calculating a luminance value based on RGB values of a said first pixel; calculating a first maximum increase of said color saturation based on the highest of said RGB values and on said luminance value; and calculating a second maximum increase of said color saturation based on the lowest of said RGB values and on said luminance value; and determining the minimum of said first and second maximum increases and saturation factor.

According to a further aspect, there is provided an apparatus for performing a modification of the color saturation of at least one pixel of an image, the apparatus comprising a memory arranged to store said image, and a processor configured to: determine, based on pixel values of a first pixel, at least one of a color saturation value, luminance value and hue value corresponding to said first pixel; determine, based on said at least one value, a saturation factor; and modify the color saturation level of said first pixel based on said saturation factor.

According to one embodiment, determining said at least one value comprises determining, based on values of said first pixel, at least two of a color saturation value, luminance value and hue value corresponding to said first pixel, and determining said saturation factor comprises determining a first maximum saturation factor based on a first of said at least two values, determining a second maximum saturation factor based on a second of said at least two values, and selecting the lowest of said first and second maximum saturation factors.

According to a further aspect, there is provided a method of increasing the color saturation of the RGB values of at least one pixel of an image, the method comprising: performing a first color saturation modification of said at least one pixel by adjusting each of said R, G and B values without modifying the luminance of said pixel; performing a second color saturation modification of said at least one pixel by keeping the highest of said R, G and B values constant and modifying the values of the other two R, G and B values with respect to the highest value.

In an embodiment, a method comprises: determining, based on pixel values of a first pixel of an image, at least one of a color saturation value, luminance value and hue value corresponding to said first pixel; determining, based on said at least one value, a saturation factor; and modifying a color saturation level of said first pixel based on said saturation factor, wherein said pixel values of said first pixel are RGB (red, green, blue) values, and wherein modifying said color saturation level comprises increasing a distance between a maximum and a minimum of said RGB values. In an embodiment, said determining said at least one value comprises determining, based on values of said first pixel, at least two of a color saturation value, luminance value and hue value corresponding to said first pixel, and wherein said determining said saturation factor comprises determining a first maximum saturation factor based on a first of said at least two values, determining a second maximum saturation factor based on a second of said at least two values, and selecting a lowest of said first and second maximum saturation factors. In an embodiment, said determining said at least one value comprises determining, based on values of said first pixel, a color saturation value, a luminance value and a hue value corresponding to said first pixel, and wherein said determining said saturation factor comprises determining a first maximum saturation factor based on said color saturation value, determining a second maximum saturation factor based on said hue value, and determining a third maximum saturation factor based on said luminance value, and selecting a lowest of said first, second and third maximum saturation factors. In an embodiment, said saturation factor is determined by a lookup table. In an embodiment, said at least one of a color saturation value, luminance value and hue value is a color saturation value, and wherein, if said color saturation value is lower than a first threshold, said saturation factor indicates a decrease in the color saturation of said pixel, and if said color saturation value is higher than said first threshold, said saturation factor indicates an increase in the color saturation of said pixel. In an embodiment, the method comprises: calculating a luminance value based on RGB values of said first pixel; calculating a first maximum increase of said color saturation based on a highest of said RGB values and on said luminance value; and calculating a second maximum increase of said color saturation based on a lowest of said RGB values and on said luminance value, wherein modifying the color saturation level of said first pixel comprises modifying said color saturation level based on a minimum of said first and second maximum increases and said saturation factor. In an embodiment, modifying said color saturation comprises performing the following operation:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said saturation factor. In an embodiment, the method comprises calculating a maximum saturation $SF_{max}$ by performing the following operation:

$$SF_{max} = a/(a-c)$$

wherein the color saturation of said pixel is modified by applying a lowest of said saturation factor and said maximum saturation. In an embodiment, the method comprises, prior to performing said color saturation modification, performing a first color saturation modification of said first pixel by performing the following matrix calculation:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, the method comprises calculating the saturation factor of said first color saturation modification by: calculating a luminance value based on RGB values of a said first pixel; calculating a first maximum increase of said color saturation based on a highest of said RGB values and on said luminance value; calculating a second maximum increase of said color saturation based on a lowest of said RGB values and on said luminance value; and determining a minimum of said first and second maximum increases and saturation factor.

In an embodiment, an apparatus comprises: a memory configured to store images; and one or more processing devices configured to modify a color saturation of at least one pixel of an image by, determining, based on pixel values of a first pixel, at least one of a color saturation value, luminance value and hue value corresponding to said first pixel; determining, based on said at least one value, a saturation factor; and modifying the color saturation level of said first pixel based on said saturation factor, wherein said pixel values of said first pixel are RGB (red, green, blue) values, and wherein modifying said color saturation level comprises increasing a distance between a maximum and a minimum of said RGB values. In an embodiment, determining said at least one value comprises determining, based on values of said first pixel, at least two of a color saturation value, luminance value and hue value corresponding to said first pixel, and wherein determining said saturation factor comprises determining a first maximum saturation factor based on a first of said at least two values, determining a second maximum saturation factor based on a second of said at least two values, and selecting a lowest of said first and second maximum saturation factors. In an embodiment, said determining said at least one value comprises determining, based on values of said first pixel, a color saturation value, a luminance value and a hue value corresponding to said first pixel, and wherein said determining said saturation factor comprises determining a first maximum saturation factor based on said color saturation value, determining a second maximum saturation factor based on said hue value, and determining a third maximum saturation factor based on said luminance value, and selecting a lowest of said first, second and third maximum saturation factors. In an embodiment, said one or more processing devices are configured to: determine a luminance value based on RGB values of said first pixel; determine a first maximum increase of said color saturation based on a highest of said RGB values and on said luminance value; and determine a second maximum increase of said color saturation based on a lowest of said RGB values and on said luminance value, wherein modifying the color saturation level of said first pixel comprises modifying said color saturation level based on a minimum of said first and second maximum increases and said saturation factor. In an embodiment, modifying said color saturation comprises performing the following operation:

$$b'=a-(a-b)\cdot SF_p'$$

$$c'=a-(a-c)\cdot SF_p'$$

where a, b and c are respectively a highest, intermediate and lowest of said RGB values, b' is a new value of said intermediate RGB value, c' is a new value of said lowest RGB value, and $SF_p'$ is said saturation factor. In an embodiment, modifying said color saturation further comprises calculating a maximum saturation $SF_{max}$ by performing the following operation:

$$SF_{max}=a/(a-c)$$

wherein the color saturation of said pixel is modified by applying a lowest of said saturation factor and said maximum saturation. In an embodiment, the one or more processing devices are configured to, prior to performing said color saturation modification, perform a first color saturation modification of said first pixel by performing the following matrix calculation:

$$\begin{bmatrix} R'_p \\ G'_p \\ B'_p \end{bmatrix} = \begin{bmatrix} W_R+(1-W_R)xSF_p & W_Gx(1-SF_p) & W_Bx(1-SF_p) \\ W_Rx(1-SF_p) & W_G+(1-W_G)xSF_p & W_Bx(1-SF_p) \\ W_Rx(1-SF_p) & W_Gx(1-SF_p) & W_B+(1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, the one or more processing devices are configured to determine the saturation factor of said first color saturation modification by: determining a luminance value based on RGB values of a said first pixel; determining a first maximum increase of said color saturation based on a highest of said RGB values and on said luminance value; determining a second maximum increase of said color saturation based on a lowest of said RGB values and on said luminance value; and determining a minimum of said first and second maximum increases and said saturation factor.

In an embodiment, a system comprises: means for determining, based on pixel values of a first pixel of an image, at least one of a color saturation value, luminance value and hue value corresponding to said first pixel; means for determining, based on said at least one value, a saturation factor; and means for modifying a color saturation level of said first pixel based on said saturation factor, wherein said pixel values of said first pixel are RGB (red, green, blue) values, and wherein modifying said color saturation level comprises increasing a distance between a maximum and a minimum of said RGB values. In an embodiment, determining said at least one value comprises determining, based on values of said first pixel, a color saturation value, a luminance value and a hue value corresponding to said first pixel, and wherein determining said saturation factor comprises determining a first maximum saturation factor based on said color saturation value, determining a second maximum saturation factor based on said hue value, and determining a third maximum saturation factor based on said luminance value, and selecting a lowest of said first, second and third maximum saturation factors. In an embodiment, the system comprises: means for calculating a luminance value based on RGB values of said first pixel; means for calculating a first maximum increase of said color saturation based on a highest of said RGB values and on said luminance value; and means for calculating a second maximum increase of said color saturation based on a lowest of said RGB values and on said luminance value, wherein modifying the color saturation level of said first pixel comprises modifying said color saturation level based on a minimum of said first and second maximum increases and said saturation factor. In an embodiment, the means for modifying said color saturation is configured to perform the following operation:

$$b'=a-(a-b)\cdot SF_p'$$

$$c'=a-(a-c)\cdot SF_p'$$

where a, b and c are respectively a highest, intermediate and lowest of said RGB values, b' is a new value of said intermediate RGB value, c' is a new value of said lowest RGB value, and $SF_p'$ is said saturation factor. In an embodiment, the system comprises means for calculating a maximum saturation $SF_{max}$ by performing the following operation:

$$SF_{max}=a/(a-c)$$

wherein the color saturation of said pixel is modified by applying a lowest of said saturation factor and said maximum saturation.

In an embodiment, a method comprises: performing, using at least one processing device, a first color saturation modification of at least one pixel of an image having RGB (red, green, blue) values by adjusting each of said R, G and B values without modifying a luminance of said pixel; and performing, using the at least one processing device, a second color saturation modification of said at least one pixel by keeping a highest of said adjusted R, G and B values constant and modifying values of the other two adjusted R, G and B values with respect to the highest value. In an embodiment, performing the first color saturation modification comprises performing the following matrix calculation:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, performing the first color saturation modification comprises calculating the saturation factor of said first color saturation modification by: calculating a luminance value based on RGB values of a said first pixel; calculating a first maximum increase of said color saturation based on a highest of said RGB values and on said luminance value; calculating a second maximum increase of said color saturation based on a lowest of said RGB values and on said luminance value; and determining a minimum of said first and second maximum increases and saturation factor. In an embodiment, performing the second color saturation modification comprises: determining, based on pixel values of the first pixel of the image, at least one of a color saturation value, luminance value and hue value corresponding to said first pixel; determining, based on said at least one value, a saturation factor; and modifying a color saturation level of said first pixel based on said saturation factor.

In an embodiment, an apparatus comprises: a first color saturation modification block configured to modify a color saturation of a pixel of an image having RGB (red, green, blue) values by adjusting each of said R, G and B values without modifying a luminance of said pixel; and a second color saturation modification block configured to modify the color saturation of the pixel of the image by keeping a highest of the adjusted R, G and B values constant and modifying values of the other two of the adjusted R, G and B values with respect to the highest value. In an embodiment, the first color saturation modification block is configured to perform a matrix calculation as follows:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, the first color saturation modification block is configured to calculate a saturation factor by: calculating a luminance value based on RGB values of a said pixel; calculating a first maximum increase of said color saturation based on a highest of said RGB values and on said luminance value; calculating a second maximum increase of said color saturation based on a lowest of said RGB values and on said luminance value; and determining a minimum of said first and second maximum increases and saturation factor. In an embodiment, the second color saturation modification block is configured to determine, based on pixel values of the pixel of the image, at least one of a color saturation value, luminance value and hue value corresponding to said pixel; determine, based on said at least one value, a saturation factor; and modify a color saturation level of said pixel based on said saturation factor.

In an embodiment, a system comprises: first means for modifying a color saturation of a pixel of an image having RGB (red, green, blue) values by adjusting the RGB values without modifying a luminance of said pixel; and second means for modifying the color saturation of the pixel of the image without modifying a highest of adjusted RGB values. In an embodiment, the first means for modifying is configured to perform a matrix calculation as follows:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, the second means for modifying is configured to: determine, based on pixel values of the pixel of the image, at least one of a color saturation value, luminance value and hue value corresponding to said pixel; determine, based on said at least one value, a saturation factor; and modify a color saturation level of said pixel based on said saturation factor. In an embodiment, the system comprises at least one of: means for receiving images; and means for storing images.

In an embodiment, a non-transitory computer-readable memory medium's contents configure a processing device to perform a method to modify a color saturation of an image, the method comprising: performing a first color saturation modification of at least one pixel of an image having RGB (red, green, blue) values by adjusting each of said R, G and B values without modifying a luminance of said pixel; and performing a second color saturation modification of said at least one pixel by keeping a highest of said adjusted RGB values constant and modifying values of the other two adjusted RGB values. In an embodiment, performing the first color saturation modification comprises performing a matrix calculation as follows:

$$\begin{bmatrix} R'_p \\ G'_p \\ B'_p \end{bmatrix} =$$

$$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, performing the second color saturation modification comprises: determining, based on pixel values of the first pixel of the image, at least one of a color saturation value, luminance value and hue value corresponding to said first pixel; determining, based on said at least one value, a saturation factor; and modifying a color saturation level of said first pixel based on said saturation factor.

In an embodiment, a non-transitory computer-readable medium's contents configure a processing device to perform a method, the method comprising: determining, based on pixel values of a first pixel of an image, at least one of a color saturation value, luminance value and hue value corresponding to said first pixel; determining, based on said at least one value, a saturation factor; and modifying a color saturation level of said first pixel based on said saturation factor, wherein said pixel values of said first pixel are RGB (red, green, blue) values, and wherein modifying said color saturation level comprises increasing a distance between a maximum and a minimum of said RGB values. In an embodiment, determining said at least one value comprises determining, based on values of said first pixel, a color saturation value, a luminance value and a hue value corresponding to said first pixel, and wherein said determining said saturation factor comprises determining a first maximum saturation factor based on said color saturation value, determining a second maximum saturation factor based on said hue value, and determining a third maximum saturation factor based on said luminance value, and selecting a lowest of said first, second and third maximum saturation factors. In an embodiment, the method comprises: calculating a luminance value based on RGB values of said first pixel; calculating a first maximum increase of said color saturation based on a highest of said RGB values and on said luminance value; and calculating a second maximum increase of said color saturation based on a lowest of said RGB values and on said luminance value, wherein modifying the color saturation level of said first pixel comprises modifying said color saturation level based on a minimum of said first and second maximum increases and said saturation factor. In an embodiment, the method comprises performing an operation as follows:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said saturation factor. In an embodiment, the method comprises calculating a maximum saturation $SF_{max}$ according to:

$$SF_{max} = a/(a-c)$$

wherein the color saturation of said pixel is modified by applying a lowest of said saturation factor and said maximum saturation. In an embodiment, the method comprises, prior to performing said color saturation modification, performing a first color saturation modification of said first pixel by performing the following matrix calculation:

$$\begin{bmatrix} R'_p \\ G'_p \\ B'_p \end{bmatrix} =$$

$$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification. In an embodiment, the method comprises calculating the saturation factor of said first color saturation modification by: calculating a luminance value based on RGB values of a said first pixel; calculating a first maximum increase of said color saturation based on a highest of said RGB values and on said luminance value; calculating a second maximum increase of said color saturation based on a lowest of said RGB values and on said luminance value; and determining a minimum of said first and second maximum increases and saturation factor.

BRIEF DESCRIPTION OF THE SEVERAL VIEWS OF THE DRAWINGS

The foregoing and other purposes, features, aspects and advantages of embodiments of the present disclosure will become apparent from the following detailed description of embodiments, given by way of illustration and not limitation with reference to the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, image sensors, processors, memories, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of embodiments.

In the following description, the term YUV will be used generally to refer to color models in which a pixel is represented as a luminance value (Y), and two chrominance values (UV). This covers a range of formats, including for example YCrCb and YPbPr.

Furthermore, throughout the following, a color saturation modification is defined based on a saturation factor, which for example represents the saturation modification as a percentage of the original color saturation, as a percentage increase, or as a gain, where for example a value of 1 indicates unitary gain.

Figure 1:
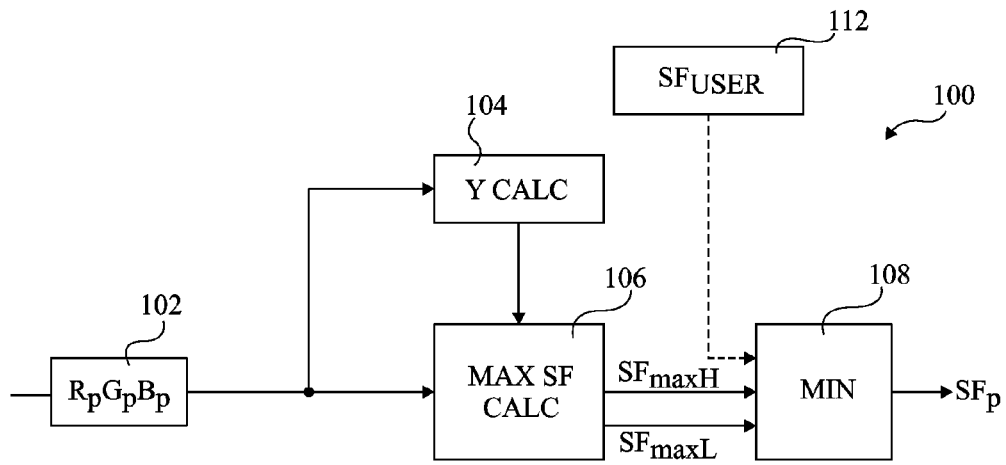
FIG. 1 schematically illustrates a module for determining a color saturation increase to be applied to a pixel according to an embodiment of the present disclosure.

FIG. 1 illustrates a module 100 for generating a saturation factor to be applied to a pixel such that the hue of the pixel is preserved.

Over-saturation of an image represented in the RGB color space can result in a clipping of one or more of the RGB values, which in turn results in image degradation. In particular, to increase pixel color saturation without increasing the luminance of the pixel, the RGB values are for example converted into an YUV format, such that a color saturation gain can be applied to the chrominance values without affecting the luminance value. However, when the modified YUV values are reconverted into RGB values, the upper or lower code limits of one or more of the RGB values may have been exceeded. This leads to image degradation, as the clipping of one or more of the RGB values results in a hue shift of the pixel, which in particular becomes apparent when a number of neighboring pixels are clipped in the same way.

With reference to FIG. 1, module 100 determines a saturation factor $SF_p$ to be applied to a pixel p of an image. Pixel p is represented as RGB values $R_p$, $G_p$, and $B_p$ at an input 102. These values are provided to a luminance calculation block 104 (Y CALC) and to a maximum saturation factor calculation block 106 (MAX SF CALC).

Block 104 determines the luminance Y of the pixel p based on the RGB values, for example based on constants $W_R$, $W_G$ and $W_B$, which are weighting coefficients corresponding to the color values R, G and B respectively. Such coefficients are for example defined for a given display monitor, and can be stored in a memory. In particular, the luminance is for example determined based on the following calculation:

$$Y = W_R R_p + W_G G_p + W_B B_p$$

Block 106 receives the luminance value Y from block 104, and also the RGB values from the input 102, and calculates maximum saturation factors $SF_{maxH}$ and $SF_{maxL}$ based on these values. The saturation factor $SF_{maxH}$ is determined based on the highest of the three RGB values, and the luminance value. The saturation factor $SF_{maxL}$ is determined based on the lowest of the RGB values, and on the luminance value Y.

The values $SF_{maxH}$ and $SF_{maxL}$ are provided to a block 108 (MIN), which selects the minimum of these values to provide an output saturation factor $SF_p$ for the current pixel p. Optionally, block 108 also receives from an input 112 a user defined color saturation value $SF_{user}$, which corresponds to a saturation increase that a user wishes to be applied across the whole a image comprising pixel p. In that case, block 108 selects the minimum of the three values $SF_{maxH}$, $SF_{maxL}$ and $SF_{user}$, to provide the saturation factor for the current pixel $SF_p$.

The maximum saturation factor $SF_{maxH}$ is for example determined as:

$$SF_{maxH} = (C_{max} - Y)/(\max(R_p, G_p, B_p) - Y) \qquad (1)$$

where $C_{max}$ is the upper limit of the code representing each of said RGB values, Y is said luminance value, and $R_p$, $G_p$ and $B_p$ are said RGB values.

The maximum saturation factor $SF_{maxL}$ is for example determined as:

$$SF_{maxL} = (Y - C_{min})/(Y - \min(R_p, G_p, B_p)) \qquad (2)$$

where $C_{min}$ is the lower limit of the code representing each of said RGB values. In the case that $C_{min}$ is zero, this becomes simply:

$$SF_{maxL} = Y/(Y - \min(R_p, G_p, B_p))$$

The upper code limit $C_{max}$ depends for example on the number of bits used to represent each RGB value. Assuming that each value is represented by n bits, the upper code limit is for example $2^n - 1$, and the lower code limit is zero. If n is equal to 8, $C_{max}$ is then 255, and $C_{min}$ is 0. Alternatively, depending on how the RGB values are defined, the upper and lower code limits could be different.

The saturation factors $SF_{maxH}$ and $SF_{maxL}$ represent the maximum value by which the color saturation of the pixel, as defined by the YUV color model, can be increased before clipping of the RGB values occurs. In the case that the user defined saturation factor $SF_{USER}$ is in the form of a percentage increase, the saturation factors $SF_{maxH}$ and $SF_{maxL}$ can also be represented in the form of a percentage, by multiplying them each by 100.

Advantageously, by calculating the saturation factor based on the minimum of $SF_{max}H$ and $SF_{max}L$, over-saturation in the RGB color space may be avoided, as will now be described in relation to FIG. 2.

Figure 2:
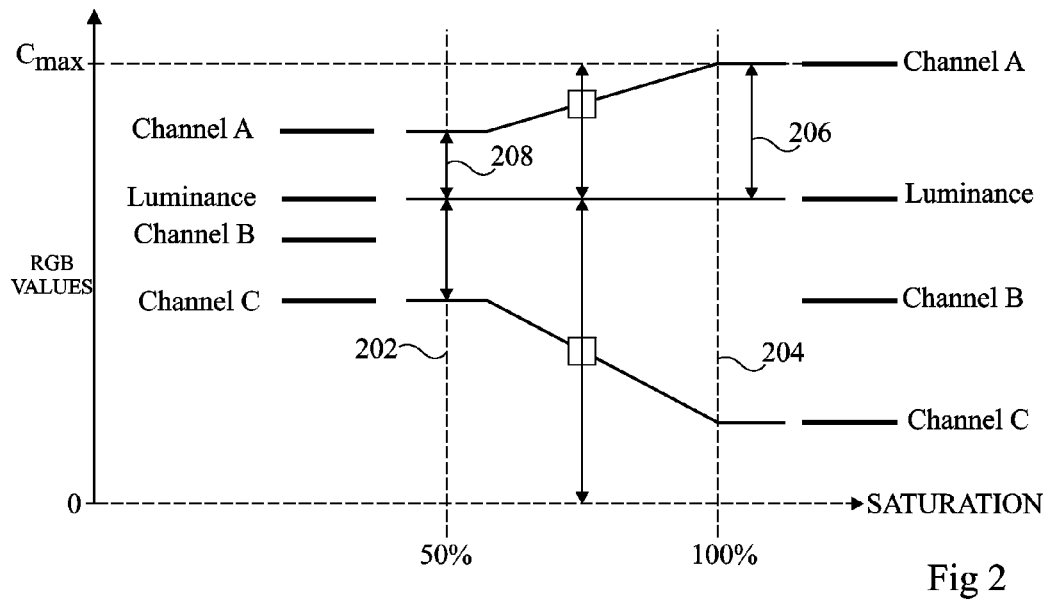
FIG. 2 is a graph illustrating an example of RGB channels before and after a color saturation increase according to an embodiment of the present disclosure.

FIG. 2 is a graph illustrating an example of RGB values, which are received on channels A, B and C, and a luminance value, before and after a saturation increase is applied. Channel A represents the highest of the three RGB values, channel C represents the lowest of the three RGB values, and channel B represents the intermediate RGB value.

The present inventor has found that, when represented in the RGB color space, a YUV saturation increase corresponds to an increase by a same factor of the distances between each of the RGB values and the luminance value. Furthermore, clipping of one the RGB values will first occur in either the highest or lowest channel.

FIG. 2 illustrates, at a dashed line 202, an example of initial RGB values of channels A, B, and C, and of a corresponding luminance value, which has a value between those of channels A and B. As the color saturation is increased, the values of channels A and C move away from the luminance value, towards the upper and lower code limits, labeled $C_{max}$ and 0 in FIG. 2. The value of channel A reaches upper code limit $C_{max}$, at a dashed line 204, before the value of channel C reaches the lower code limit. This point represents the optimum saturation increase, just before any clipping of the RGB values occurs.

The saturation factor $SF_{maxH}$ described above with reference to FIG. 1 corresponds to the gain that is applied to the value of channel A such that it just reaches the upper code limit $C_{max}$. Indeed, with reference to formula (1) above, the distance labeled 206 in FIG. 2 between $C_{max}$ and the luminance value is equal to $C_{max}-Y$, and the distance labeled 208 between channel A and the luminance value is equal to max$(R_p,G_p,B_p)-Y$. The ratio between these two distances determines the saturation factor to be applied to bring channel A to the upper code limit $C_{max}$.

Calling such a saturation 100 percent, the initial saturation can then be defined as a percentage of this maximum permissible saturation, and in the example of FIG. 2 the saturation is thus initially at 50 percent.

The saturation factor $SF_{maxL}$ calculated for the example of FIG. 2, is higher than $SF_{maxH}$. However, in alternative examples, the value of channel C could hit the lower code limit before the value of channel A hits the upper code limit, and in this case it would be the value of $SF_{maxL}$ that is the determining value.

Figure 3:
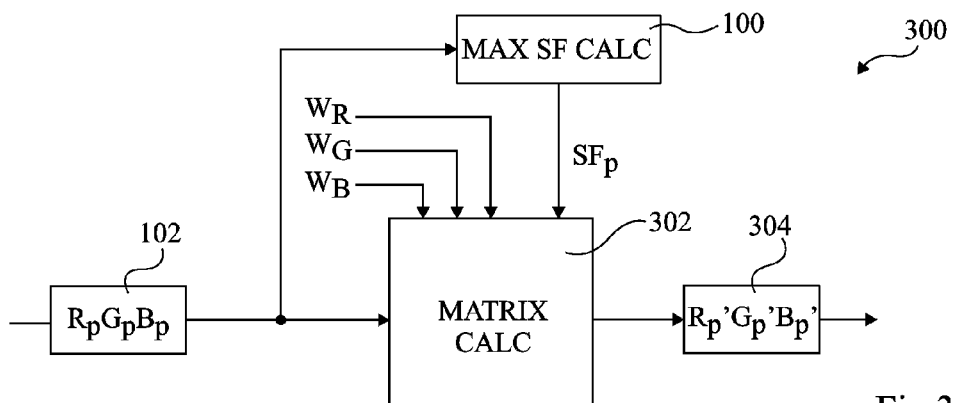
FIG. 3 schematically illustrates an apparatus for increasing the color saturation of one or more pixels of an image according to an embodiment of the present disclosure.

FIG. 3 illustrates a system 300 for increasing the color saturation level of the RGB pixel p of FIG. 1 received at input 102. As illustrated, the RGB values are provided to a matrix calculation block 302 (MATRIX CALC), which also receives the saturation factor $SF_p$ generated by module 100 (MAX SF CALC) of FIG. 1, and also the weighting coefficients $W_R$, $W_G$ and $W_B$. Block 302 applies a matrix operation on the RGB values based on saturation factor and on the weighting coefficients, in order to provide modified RGB values $R'_p$, $G'_p$ and $B'_p$ at an output 304 for the pixel p.

For example, the matrix calculation that is applied by block 302 is as follows:

$$\begin{bmatrix} R'_p \\ G'_p \\ B'_p \end{bmatrix} = \begin{bmatrix} W_R+(1-W_R)xSF_p & W_Gx(1-SF_p) & W_Bx(1-SF_p) \\ W_Rx(1-SF_p) & W_G+(1-W_G)xSF_p & W_Bx(1-SF_p) \\ W_Rx(1-SF_p) & W_Gx(1-SF_p) & W_B+(1-W_B)xSF_p \end{bmatrix} \cdot \begin{bmatrix} R_p \\ G_p \\ B_p \end{bmatrix}$$

Such a matrix calculation corresponds to a transformation of the input RGB values $R_p$, $G_p$ and $B_p$ into luminance and chrominance values, the application of the saturation factor $SF_p$ to the chrominance values, and the transformation of the luminance and modified chrominance values back into the RGB color model in the form of values $R_p'$, $G_p'$ and $B_p'$.

For example, if a color saturation increase is to be applied to an entire image comprising pixels 0 to P, each pixel p is provided to the module 100 and to the matrix calculation block 302 of FIG. 3 in parallel, such that, for each pixel p, a corresponding saturation factor $SF_p$ can be generated and applied to the pixel by the matrix calculation block 302. In the case that a user also defines a color saturation increase for the image, each pixel will be modified based on the value $SF_{maxH}$, $SF_{maxL}$ or $SF_{USER}$, whichever is lowest.

Alternatively, no user saturation increase may be specified, but instead the user may request that an optimum color saturation increase is applied to each pixel. In this case, the lowest of the maximum saturation increase values $SF_{maxH}$ and $SF_{maxL}$ is for example applied to each pixel.

Figure 4:
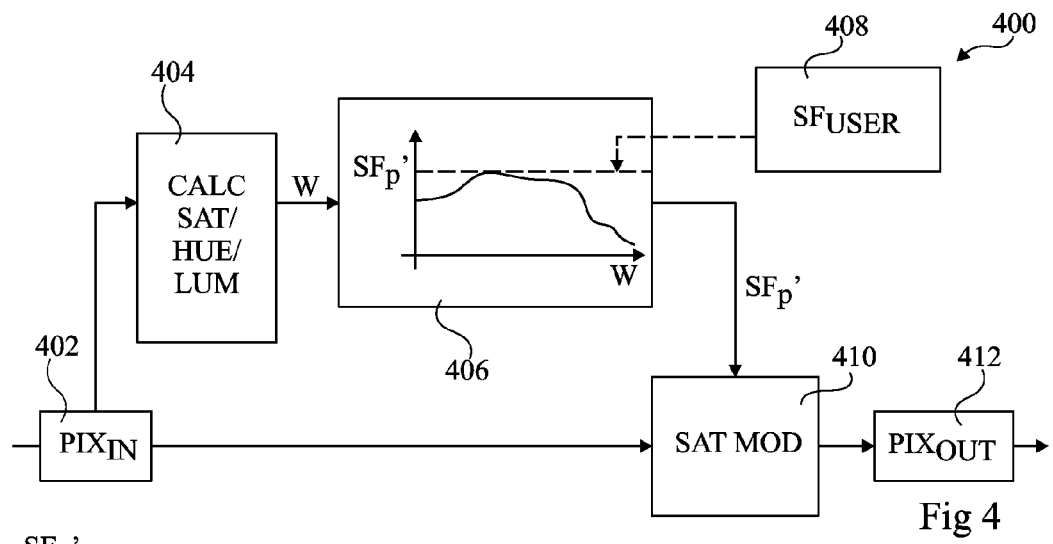
FIG. 4 schematically illustrates an apparatus for modifying the color saturation of one or more pixels of an image according to an embodiment of the present disclosure.

FIG. 4 illustrates an apparatus 400 for modifying the color saturation of one or more pixels according to an embodiment.

An input color pixel value 402 ($PIX_{IN}$) may be any format, including but not limited to RGB, HSV (Hue Saturation Value), YUV, etc. The pixel value is provided to a calculation block 404 (CAL SAT/HUE/LUM), which determines one of the color saturation, hue and luminance of the pixel. In the case that the pixel is in the HSV format, this information can be extracted directly.

Alternatively, in the case that the signal is in the RGB color space, the luminance can be calculated as described above. The color saturation in the YUV color space can be determined by determining the saturation factor explained above with reference to FIG. 1, and then taking the inverse of this factor. The hue, on a scale of 0 to 360, can be calculated by the following equations based on the RGB values:

IF max$(R,G,B)=R$:Hue=60*$(G-B)/(R-\min(R,G,B))$

IF max$(R,G,B)=G$:Hue=120+60*$(B-R)/(G-\min(R,G,B))$

IF max$(R,G,B)=B$:Hue=240+60*$(R-G)/(B-\min(R,G,B))$ where on the scale of 0 to 360, the values 0 and 360 correspond to red, the value 120 corresponds to green, and the value 240 corresponds to blue, and intermediate values correspond to intermediate color shapes. Saturation the HSV color space can be determined as follows:

$SAT_{HSV}$=(max−min)/max where max is equal to max$(R,G,B)$ and min is equal to min$(R,G,B)$.

Furthermore, in the case that the pixel is in the YUV color space, the color saturation and hue can be extracted by first converting the signals into the RGB color space, and then as described above.

The block 404 provides a color saturation, hue or luminance value W to a transformation block 406, which transforms this value W into a saturation factor $SF'_p$ to be applied to the pixel. For example, the block 406 comprises a look-up table, which provides a certain saturation factor for each value or range of values of the value W. This is illustrated by a curve in FIG. 4, representing the relationship between the value W and the saturation factor. Such a transformation is for example implemented by a lookup table, or by the application of a certain formula describing the transformation. In some cases, such as if W is a saturation value, the saturation factor corresponding to the peak of the curve is set by a user defined saturation increase $SF_{USER}$ provided by a block 408. For example, saturation factors for each value W are defined as a fraction or percentage of the user defined saturation factor, the peak of the curve corresponding to 100 percent of the user defined saturation factor. Alternatively, the magnitude of the curve could be user defined.

The saturation factor $SF_p'$ from block 406 is provided to a color saturation modification block 410 (SAT MOD), which also receives the pixel value 402, and modifies its color saturation based on the saturation factor $SF_p'$. It provides an output pixel 412 ($PIX_{OUT}$).

Figure 5A:
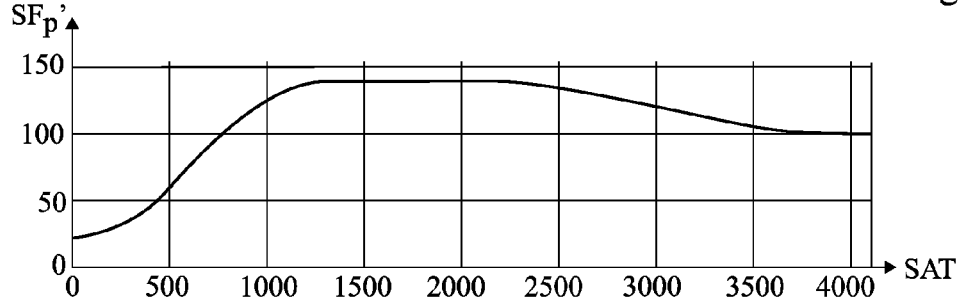
FIGS. 5A to 5C are graphs showing examples of curves representing transformations made by a transformation block of FIG. 4 according to embodiments of the present disclosure.
Figure 5B:
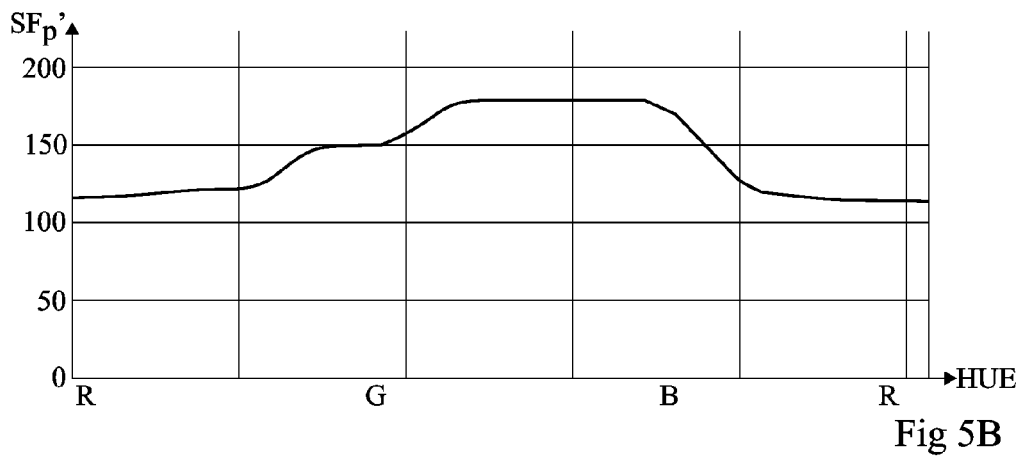
Figure 5C:
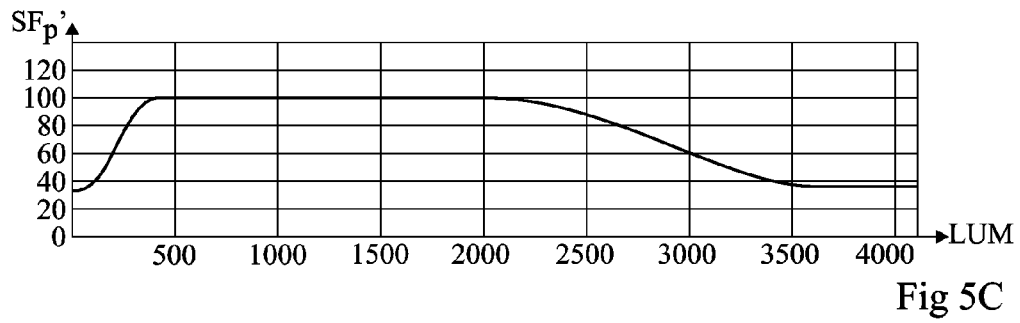

FIGS. 5A, 5B and 5C are graphs illustrating examples of the relationships between the value V and the saturation factor $SF'_p$, in the case that the value is the color saturation, hue and luminance respectively.

FIG. 5A illustrates the saturation factor $SF'_p$ for saturation values of between 0 and 4095, assuming a 12-bit saturation value, although an alternative scale could be used, which may be for example user defined. For color saturations between 0 and 1000, the saturation factor is approximately proportional to the color saturation, for example progressively increasing from 25 to 140 percent. For color saturation values between 1000 and 2000, the saturation factor stable, for example at around 140 percent. Between color saturation levels of 2000 to 4000, the saturation factor is inversely proportional to the color saturation, for example progressively decreasing from 140 percent to 100 percent.

More generally, the relation between the pixel saturation and the saturation factor is for example such that, for relatively low color saturations, relatively low saturation factors are provided, for intermediate color saturation values, a relatively high saturation factor is provided, and for relatively high color saturations, relatively low saturation factors are provided.

FIG. 5B illustrates the saturation factor $SF_p'$ for hue values progressing from red to green to blue and back to red again, for example on a scale of 0 to 360 as described above. Alternatively, the hue could be remapped to a power of 2, such as a scale of 0 to 255, in other words 8-bits. In this example, hues close to red result in a relatively low saturation factor, for example at around 120 percent. Indeed, such hues often indicate faces, which are preferably not highly saturated. Hues close to green result in an intermediate saturation factor, for example of around 150 percent, while hues close to blue for example result in a relatively high saturation factor, for example of around 180 percent. Indeed, greens and blues in pictures often correspond to vegetation and sky, which generally benefits from relatively high color saturation.

FIG. 5C illustrates the saturation factor $SF'_p$ for luminance values of between 0 and 4095, assuming 12-bit luminance values, although other scales could be used. For luminance values between 0 and 500, the saturation factor is approximately proportional to the color saturation, for example progressively increasing from 30 to 100 percent. For color saturation values between 500 and 2000, the saturation factor is stable, for example at around 100 percent. Between color saturation levels of 2000 and 3500, the saturation factor is inversely proportional to the color saturation, for example progressively decreasing from 100 to 35 percent, and between 3500 and 4000 it is stable, for example at 35 percent.

Thus, for very low luminance values and relatively high luminance values, the saturation factor is low, whereas for intermediate luminance values, higher saturation factors are provided.

Figure 6:
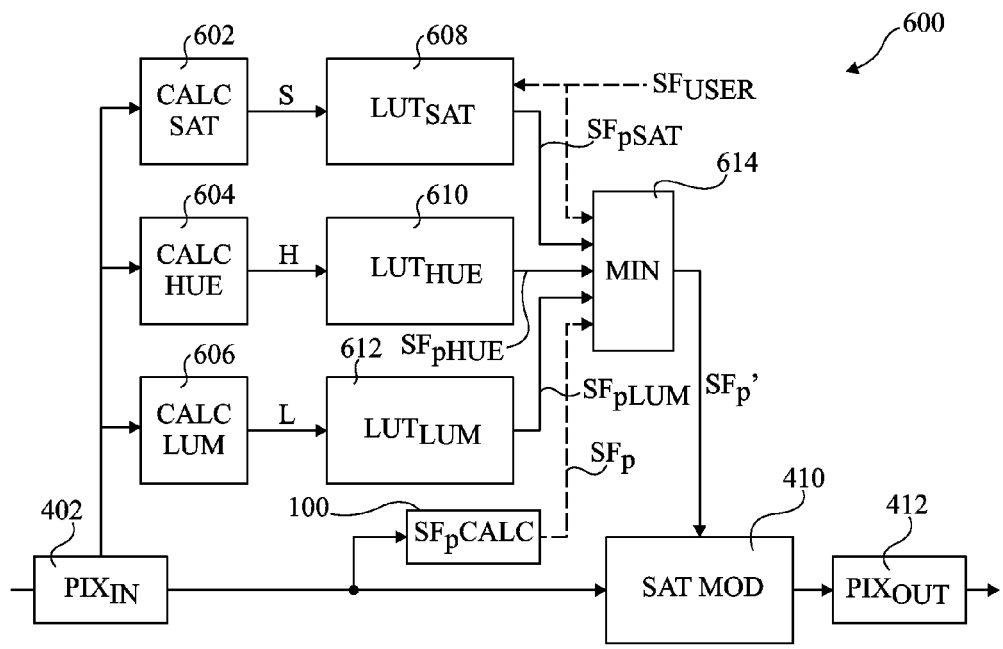
FIG. 6 schematically illustrates an apparatus for modifying the color saturation of one or more pixels of an image according to an embodiment of the present disclosure.

FIG. 6 illustrates an apparatus 600 for modifying the color saturation of one or more pixels according to an embodiment. Features in common with the apparatus 400 of FIG. 4 have been labeled with like references, and will not be described again in detail.

Rather than a single calculation block and transformation block, the circuit of FIG. 6 comprises three calculation blocks 602 (CALC SAT), 604 (CALC HUE) and 606 (CALC LUM) for determining the color saturation, hue and luminance of the pixel respectively, and three transformation blocks 608 ($LUT_{SAT}$), 610 ($LUT_{HUE}$) and 612 ($LUT_{LUM}$) implemented as look-up tables for transforming the color saturation, hue and luminance values respectively into saturation factors $SF_{pSAT}$, $SF_{pHUE}$ and $SF_{pLUM}$. Each block 608, 610, 612 is for example implemented as a lookup table performing the transformation represented by the graphs of FIGS. 5A, 5B and 5C described above. The three saturation factors $SF_{pSAT}$, $SF_{pHUE}$ and $SF_{pLUM}$ are provided to a block 614 (MIN), which determines the minimum of these values to provide the saturation factor $SF_p'$ to be applied to the pixel, using the block 410.

Optionally, a user defined saturation level $SF_{USER}$ is provided to transformation block 608, for determining the peak color saturation as described above. Additionally or alternatively, the user defined color saturation level may be provided as another input to the block 614, such that it will be selected if it is lower than all the other saturation factors.

Furthermore, optionally the module 100 described above with reference to FIG. 1 is also provided, and receives the input pixel 402. In this case, the input pixel comprises RGB values, and the block 100 generates a further saturation factor $SF_p$ that avoids a hue shift of the RGB value, as described above. This saturation factor is for example provided as an additional input to the block 614, such that it will be selected as the saturation factor $SF_p'$ if it is lower than the other inputs.

In the case that the input pixel 402 is in the format RGB, the blocks 602, 604 and 606 could be implemented by a single block that performs a conversion from RGB to HSV.

In alternative embodiments, one or two of the calculation blocks 602, 604, 606, and the one or two corresponding transformation blocks 608, 610, 612, could be removed.

Figure 7:
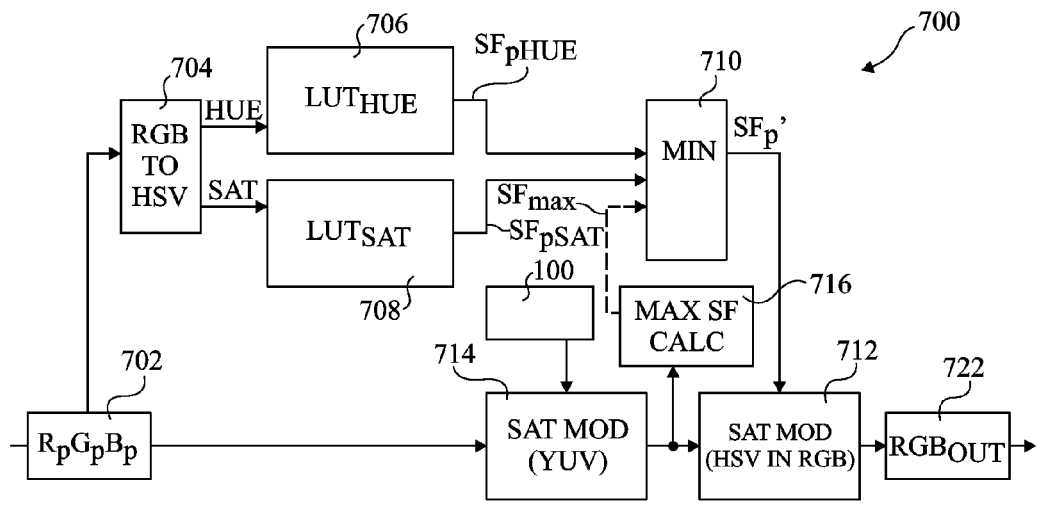
FIG. 7 schematically illustrates an apparatus for modifying the color saturation of one or more pixels of an image according to an embodiment of the present disclosure.

FIG. 7 illustrates an apparatus 700 for modifying the color saturation of a pixel according to an embodiment.

An input pixel 702 is in the RGB format, comprising three channels $R_p$, $G_p$ and $B_p$ of a pixel p. The input pixel is provided to a conversion block 704 (RGB TO HSV), which converts the RGB values into the HSV format.

In the example of FIG. 7, there are two transformation blocks 706 ($LUT_{HUE}$), 708 ($LUT_{SAT}$), which receive the hue and color saturation values respectively from block 704, and provide saturation factors $SF_{pHUE}$ and $SF_{pSAT}$. Alternatively, there could be one or three of the transformation blocks 608, 610, 612 of FIG. 6. The blocks are for example implemented by lookup tables, which for example apply the transformations represented by the corresponding curves of FIGS. 5A, 5B and 5C. Alternatively, the transformations are those represented by FIGS. 8A and 8B, as will now be described.

Figure 8A:
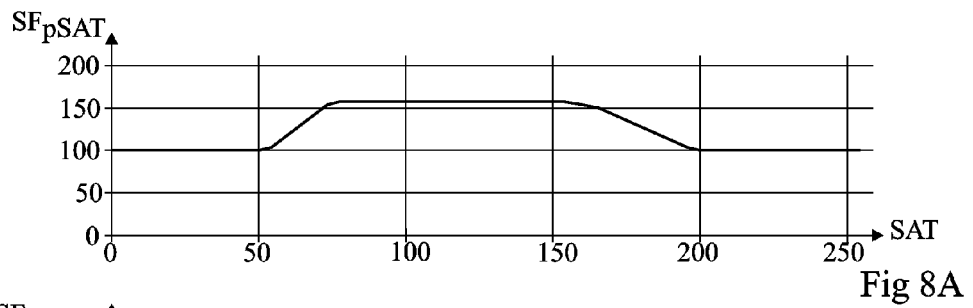
FIGS. 8A and 8B are graphs showing examples of curves representing transformations made by transformation blocks of FIG. 7 according to embodiments of the present disclosure.

FIG. 8A illustrates the saturation factor $SF_{pSAT}$ for saturation values of between 0 and 255, assuming an 8-bit saturation value, although an alternative scale could be used, which is for example user defined. For color saturations between 0 and 50, no saturation increase is applied. Then, between color saturations of 50 and 75, the saturation factor $SF_{pSAT}$ progressively increases from 100 to 160 percent. For color saturation values between 75 and 150, the saturation factor $SF_{pSAT}$ is relatively stable at 160 percent, before progressively falling back to 100 percent between color saturations of 150 to 200. Between color saturation levels of 200 and 255, the saturation factor $SF_{pSAT}$ is equal to 100 percent, implying no saturation increase.

Figure 8B:
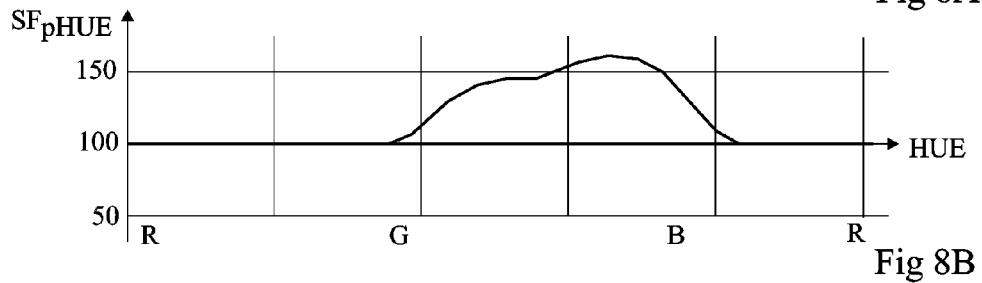

FIG. 8B illustrates the saturation factor $SF_{pHUE}$ for hue values progressing from red to green to blue and back to red again, for example on a scale of 0 to 360, or on a scale based on a power of 2, such as a scale of 0 to 255, in other words 8-bits. In this example, hues from red to green, i.e., from 0 to around 100 on a scale of 0 to 255, result in a relatively low saturation factor, for example at 100 percent. Then, the saturation factor $SF_{pHUE}$ rises progressively and reaches around 145 percent at around a hue of 120, which is maintained until a hue of around 140. For, hues of around 140 to 175, the saturation factor $SF_{pHUE}$ increases to around 170 percent, before falling progressively back to 100 percent at a hue of around 200, corresponding to the start of red again.

The color saturation factors $SF_{pSAT}$ and $SF_{pHUE}$ are provided to a block 710 (MIN), which determines the minimum of these saturation factors in order to provide an output saturation factor $SF_p'$ used to increase the pixel saturation of pixel p.

The saturation factor $SF_p'$ from block 710 is provided to a color saturation modification block 712 (SAT MOD (HSV IN RGB)). Rather than receiving the input pixel directly, block 712 receives it after an initial color saturation modification has also ready been performed by a block 714 (SAT MOD (YUV)). Block 714 for example applies the saturation factor $SF_p$ generated by the module 100 of FIG. 1 described above. Thus, this saturation factor $SF_p$ for example corresponds to the maximum saturation increase without clipping the RGB values. Alternatively block 714 could apply a user defined saturation factor.

Both blocks 712 and 714 apply a color saturation to the RGB values, but the color saturation applied by block 714 is for example a color saturation modification defined according to the YUV color space, in which the distance of the RGB values from the luminance value is modified, whereas block 712 applies a color saturation modification according to the HSV color space, according to which the distance between the highest of the RGB values and the other two RGB values is modified. This will be described in more detail below with reference to FIG. 9.

Optionally, block 710 may also receive a maximum saturation factor $SF_{max}$ from a calculation block 716, which determines the maximum saturation increase that can be applied to the RGB values as modified by block 714, while avoiding clipping of the RGB values, as will be described in more detail below. In this case, the block 710 outputs the minimum of the three saturation factors $SF_{max}$, $SF_{pHUE}$ and $SF_{pSAT}$.

In some embodiments, rather than applying the saturation factor $SF_p'$ provided by block 710, block 712 could apply a saturation factor defined in a different fashion, such as a user-defined saturation factor. In such a case, blocks 704, 706, 708 and 710 could be removed.

Figure 9:
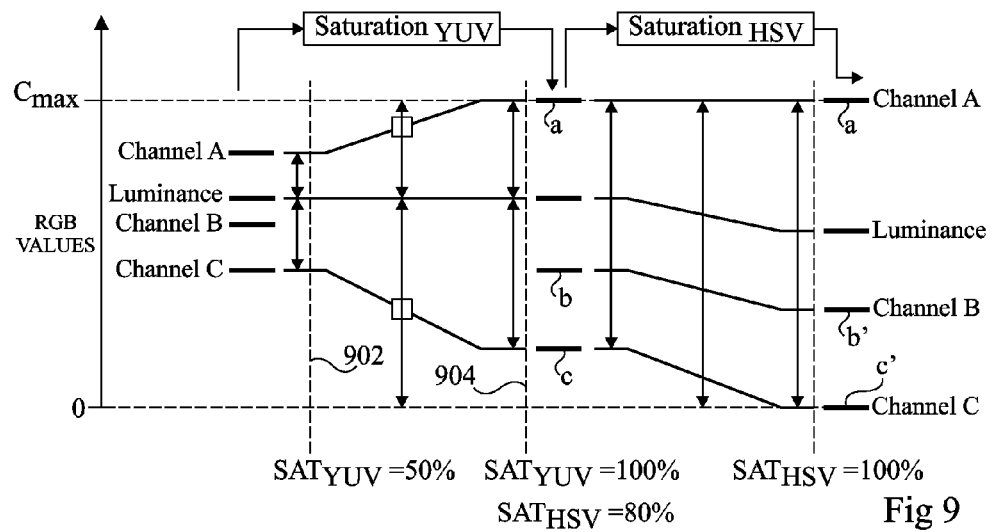
FIG. 9 is a graph illustrating an example of RGB channels before and after a two-stage saturation modification according to an embodiment of the present disclosure.

FIG. 9 is a graph showing an example of a two-stage color saturation modification. As with FIG. 2, the channel A is the maximum of the RGB values, channel C is the minimum of the RGB values, and channel B is the median of the RGB values.

The initial values of channels A, B and C of the RGB input pixel, at a point shown by dashed line 902, for example correspond to 50 percent of the maximum saturation increase that can be applied in the YUV color space before clipping of the RGB channels occurs. In the example of FIG. 9, the block 714 of FIG. 7 applies the maximum saturation increase, bringing the color saturation to 100 percent, as shown by dashed line 904. Thus, the luminance remains constant, whereas the channels A, B and C are distanced from the luminance.

Next, block 712 of FIG. 7 applies a color saturation modification in the HSV color space. For example, this results in an increase in the spacing of channels B and C with respect to the highest channel, which is channel A. In particular assuming channels A, B and C initially have values a, b and c, after application of the saturation factor $SF_p'$, the value of channel A will remain at a, while the modified values b' and c' of channels B and C become:

$$b'=a-(a-b)\cdot SF_p'$$

$$c'=a-(a-c)\cdot SF_p'$$

If the modified value c' of channel C is chosen to equal zero, the value of $SF_p'$ that results in a maximum saturation increase while avoiding clipping of the RGB values can be calculated, in other words the value results in channel C just hitting the minimum code value, which is for example equal to zero. In other word, the following calculation can be made:

$$SF_{max}=a/(a-c)$$

where a is equal to $\max(R_p,G_p,B_p)$ and c is equal to $\min(R_p,G_p,B_p)$. It should be noted that advantageously the hue is preserved during this two-stage saturation modification.

Figure 10:
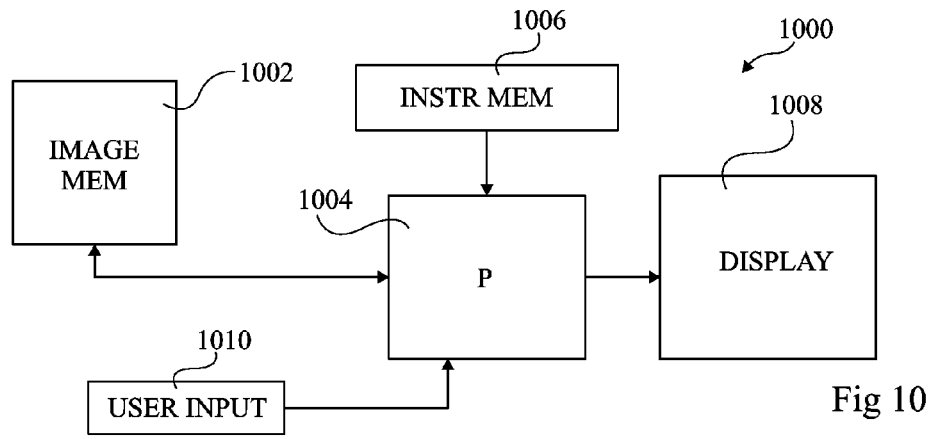
FIG. 10 illustrates a device for image processing according to an embodiment of the present disclosure.

FIG. 10 illustrates a processing device 1000 for processing images according to the methods described herein. An image memory 1002 (IMAGE MEM) stores one or more images, for which a color saturation modification is to be applied. The image memory is coupled to a processor 1004 (P), which is under the control of an instruction memory 1006 (INSTR MEM). The instructions of instruction memory 1006 control the processor 1004 to implement the color saturation increase described above, and a display 1008 (DISPLAY) is for example provided for displaying the resulting image. A user input 1010 (USER INPUT) for example allows the use to select an image from the image memory 1002 for processing, and also to optionally define a user saturation factor.

The device 1000 is for example a PC (personal computer) or laptop computer, digital camera, or other electronic device capable of processing a digital image.

In some embodiments, the pixels of an image to be processed according to the methods described herein could be streamed to device 1000, in which case the image memory 1002 could be omitted.

An advantage of an embodiment of generating a maximum saturation factor for a pixel based on the minimum and maximum of the RGB values is that clipping of the RGB values may be avoided, and thus facilitate the hue of the pixel being maintained.

Furthermore, an advantage of an embodiment of determining a saturation factor based on one of the color saturation, hue and luminance of a pixel is that the color saturation may be automatically limited based on the characteristics of the image.

Furthermore, an advantage of an embodiment of performing a two-stage color saturation modification, firstly by modifying the distance between the luminance and each of the RGB channels while maintaining the luminance, and secondly by modifying the distance between the maximum of the RGB channels and each of the other RGB channels, is that a broader saturation increase may be applied. Furthermore, most of the saturation increase is applied in a safe fashion, while preserving the luminance, and then additionally color saturation can be applied to specific hues, that for example decreases the luminance while preserving the hue, and leading to an improved image quality, for example darker and/or deeper color shades. This can be particularly advantageous in the case of blue skies.

Having thus described at least one illustrative embodiment, various alterations, modifications and improvements will readily occur to those skilled in the art.

For example, it will be apparent to those skilled in the art that, while the embodiments herein describe the modification of the color saturation of one pixel or of all the pixels of an image, in alternative embodiments, only certain pixels of an image may be selected for modification.

Furthermore, it will be apparent to those skilled in the art that, while FIG. 10 relates to a software implementation of the embodiments described here, alternatively the embodiments described herein could be implement at least partially in hardware.

Furthermore, the various features described in relation to the embodiments of the present disclosure could be combined in alternative embodiments in any combination.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums. The various embodiments described above can be combined to provide further embodiments. Concurrently filed U.S. patent application Ser. No. 13/624,624 is incorporated herein by reference in its entirety (which claims priority to French Application Nos. 1158374 and 1158375, both filed Sep. 21, 2011). Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining, based on pixel values of a first pixel of an image, at least two of a color saturation value, luminance value and hue value corresponding to said first pixel;
   determining a lowest saturation factor of a set of saturation factors, the set of saturation factors including a first maximum saturation factor based on a first of said at least two values and a second maximum saturation factor based on a second of said at least two values; and
   modifying a color saturation level of said first pixel based on said lowest saturation factor.

2. The method of claim 1 wherein said determining said at least two values comprises determining, based on values of said first pixel, a color saturation value, a luminance value and a hue value corresponding to said first pixel, and wherein said set of saturation factors includes a third maximum saturation factor based on a third value of said at least two values.

3. The method of claim 1, comprising determining said first maximum saturation factor and said second maximum saturation factor based on lookup tables.

4. The method of claim 1 wherein said first of said values is a color saturation value, and wherein, if said color saturation value is lower than a first threshold, said first maximum saturation factor indicates a decrease in the color saturation of said first pixel, and if said color saturation value is higher than said first threshold, said first maximum saturation factor indicates an increase in the color saturation of said first pixel.

5. The method of claim 1, comprising:
   calculating a luminance value based on RGB (red, green, blue) values of said first pixel;
   calculating a first maximum increase of color saturation based on a highest of said RGB values and on said luminance value; and
   calculating a second maximum increase of said color saturation based on a lowest of said RGB values and on said luminance value, wherein modifying the color saturation level of said first pixel comprises modifying said color saturation level based on a minimum of said first and second maximum increases of color saturation and said lowest saturation factor.

6. The method of claim 1 wherein said pixel values of said first pixel are RGB (red, green, blue) values, and wherein modifying said color saturation comprises increasing a distance between a maximum and a minimum of said RGB values.

7. The method of claim 6, wherein modifying said color saturation level comprises applying:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said lowest saturation factor.

8. The method of claim 7, comprising calculating a maximum saturation $SF_{max}$ by applying:

$$SF_{max} = a/(a-c)$$

wherein the color saturation of said pixel is modified by applying a lowest of said saturation factor and said maximum saturation.

9. The method of claim 7, comprising, prior to performing said color saturation modification, performing a first color saturation modification of said first pixel by performing a matrix calculation:

$$\begin{bmatrix} R'_p \\ G'_p \\ B'_p \end{bmatrix} =$$

-continued $$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to R, G and B values respectively, and $SF_p$ is a saturation factor of said first color saturation modification.

10. The method of claim 9, comprising calculating the saturation factor of said first color saturation modification by:
    calculating a luminance value based on RGB values of said first pixel;
    calculating a first maximum increase of said color saturation based on a highest of said RGB values and on said luminance value;
    calculating a second maximum increase of said color saturation based on a lowest of said RGB values and on said luminance value; and
    determining a minimum of said first and second maximum increases and said lowest saturation factor.

11. An apparatus, comprising:
    a memory configured to store images; and
    one or more processing devices configured to modify a color saturation of at least one pixel of an image by,
        determining, based on pixel values of a first pixel, at least two of a color saturation value, luminance value and hue value corresponding to said first pixel;
        determining a first maximum saturation factor based on a first of said at least two values and a second maximum saturation factor based on a second of said at least two values;
        selecting a lowest saturation factor of a set of saturation factors including said first and second maximum saturation factors; and
        modifying the color saturation level of said first pixel based on said selected saturation factor.

12. The apparatus of claim 11 wherein the one or more processors are configured to determine a third maximum saturation factor based on a third of said at least two values and the set of saturation factors includes the third maximum saturation factor.

13. The apparatus of claim 11 wherein said one or more processing devices are configured to:
    determine a luminance value based on RGB (red, green, blue) values of said first pixel;
    determine a first maximum increase of said color saturation based on a highest of said RGB values and on said luminance value; and
    determine a second maximum increase of said color saturation based on a lowest of said RGB values and on said luminance value, wherein modifying the color saturation level of said first pixel comprises modifying said color saturation level based on a minimum of said first and second maximum increases and said lowest saturation factor.

14. The apparatus of claim 11 wherein said pixel values of said first pixel are RGB (red, green, blue) values, and wherein modifying said color saturation comprises increasing a distance between a maximum and a minimum of said RGB values.

15. The apparatus of claim 14 wherein modifying said color saturation comprises performing an operation as follows:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said lowest saturation factor.

16. The apparatus of claim 15 wherein modifying said color saturation comprises calculating a maximum saturation $SF_{max}$ by performing the following operation:

$$SF_{max} = a/(a-c)$$

wherein the color saturation of said pixel is modified by applying a lowest of said lowest saturation factor and said maximum saturation.

17. The apparatus of claim 15 wherein the one or more processing devices are configured to, prior to performing said color saturation modification, perform a first color saturation modification of said first pixel by performing the following matrix calculation:

$$\begin{bmatrix} R'_p \\ G'_p \\ B'_p \end{bmatrix} =$$

$$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification.

18. The apparatus of claim 17 wherein the one or more processing devices are configured to determine the saturation factor of said first color saturation modification by:
    determining a luminance value based on RGB values of a said first pixel;
    determining a first maximum increase of said color saturation based on a highest of said RGB values and on said luminance value;
    determining a second maximum increase of said color saturation based on a lowest of said RGB values and on said luminance value; and
    determining a minimum of said first and second maximum increases and said saturation factor.

19. A system, comprising:
    means for determining, based on pixel values of a first pixel of an image, at least two of a color saturation value, luminance value and hue value corresponding to said first pixel;
    means for determining, based on said at least two values, at least two saturation factors;
    means for selecting a lowest of said at least two saturation factors; and
    means for modifying a color saturation level of said first pixel based on said selected saturation factor.

20. The system of claim 19 wherein said means for determining said at least two values is configured to determine, based on values of said first pixel, a color saturation value, a luminance value and a hue value corresponding to said first pixel, and wherein said means for determining said at least two saturation factors is configured to determine a first maximum saturation factor based on said color saturation value, a second maximum saturation factor based on said hue value, and a third maximum saturation factor based on said luminance value.

21. The system of claim 19, further comprising:
means for calculating a luminance value based on RGB (red, green, blue) values of said first pixel;
means for calculating a first maximum increase of said color saturation based on a highest of said RGB values and on said luminance value; and
means for calculating a second maximum increase of said color saturation based on a lowest of said RGB values and on said luminance value, wherein the means for modifying the color saturation level of said first pixel is configured to modify said color saturation level based on a minimum of said first and second maximum increases and said selected saturation factor.

22. The system of claim 19 wherein said pixel values of said first pixel are RGB (red, green, blue) values and the means for modifying said color saturation level is configured to increase a distance between a maximum and a minimum of said RGB values.

23. The system of claim 22 wherein the means for modifying said color saturation is configured to perform an operation as follows:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said selected saturation factor.

24. The system of claim 22, further comprising means for calculating a maximum saturation $SF_{max}$ by performing an operation:

$$SF_{max} = a/(a-c)$$

where a and c are respectively a highest and lowest of said RGB values and wherein the color saturation of said pixel is modified by applying a lowest of said selected saturation factor and said maximum saturation.

25. A method, comprising:
performing, using at least one processing device, a first color saturation modification of at least one pixel of an image having RGB (red, green, blue) values by adjusting each of said R, G and B values without modifying a luminance of said pixel; and
performing, using the at least one processing device, a second color saturation modification of said at least one pixel by keeping a highest of said adjusted R, G and B values constant and modifying values of the other two adjusted R, G and B values with respect to the highest value.

26. The method of claim 25 wherein performing the first color saturation modification comprises:
performing a matrix calculation:

$$\begin{bmatrix} R_p' \\ G_p' \\ B_p' \end{bmatrix} =$$

$$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R_p'$, $G_p'$, and $B_p'$ are RGB values after said first color saturation modification, $W_R$, $W_G$ and $W_B$ are constant weighting coefficients corresponding to the R, G and B values respectively, and $SF_p$ is a saturation factor of said first color saturation modification.

27. The method of claim 26 wherein performing the first color saturation modification comprises calculating the saturation factor of said first color saturation modification by:
calculating a luminance value based on RGB values of a said first pixel;
calculating a first maximum increase of said color saturation based on a highest of said RGB values and on said luminance value;
calculating a second maximum increase of said color saturation based on a lowest of said RGB values and on said luminance value; and
determining a minimum of said first and second maximum increases and saturation factor.

28. The method of claim 25 wherein performing the second color saturation modification comprises:
determining, based on pixel values of the first pixel of the image, at least one of a color saturation value, luminance value and hue value corresponding to said first pixel;
determining, based on said at least one value, a saturation factor; and
modifying a color saturation level of said first pixel based on said saturation factor.

29. An apparatus, comprising:
a first color saturation modification block configured to modify a color saturation of a pixel of an image having RGB (red, green, blue) values by adjusting each of said R, G and B values without modifying a luminance of said pixel; and
a second color saturation modification block configured to modify the color saturation of the pixel of the image by keeping a highest of the adjusted R, G and B values constant and modifying values of the other two of the adjusted R, G and B values with respect to the highest value.

30. The apparatus of claim 29 wherein the first color saturation modification block is configured to perform a matrix calculation as follows:

$$\begin{bmatrix} R_p' \\ G_p' \\ B_p' \end{bmatrix} =$$

$$\begin{bmatrix} W_R + (1-W_R)xSF_p & W_Gx(1-SF_p) & W_Bx(1-SF_p) \\ W_Rx(1-SF_p) & W_G + (1-W_G)xSF_p & W_Bx(1-SF_p) \\ W_Rx(1-SF_p) & W_Gx(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R_p'$, $G_p'$, and $B_p'$ are RGB values after said first color saturation modification, $W_R$, $W_G$ and $W_B$ are constant weighting coefficients corresponding to the R, G and B values respectively, and $SF_p$ is a saturation factor of said first color saturation modification.

31. The apparatus of claim 30 wherein the first color saturation modification block is configured to calculate a saturation factor by:
  calculating a luminance value based on RGB values of a said pixel;
  calculating a first maximum increase of said color saturation based on a highest of said RGB values and on said luminance value;
  calculating a second maximum increase of said color saturation based on a lowest of said RGB values and on said luminance value; and
  determining a minimum of said first and second maximum increases and saturation factor.

32. The apparatus of claim 29 wherein the second color saturation modification block is configured to:
  determine, based on pixel values of the pixel of the image, at least one of a color saturation value, luminance value and hue value corresponding to said pixel;
  determine, based on said at least one value, a saturation factor; and
  modify a color saturation level of said pixel based on said saturation factor.

33. A system, comprising:
  first means for modifying a color saturation of a pixel of an image having RGB (red, green, blue) values by adjusting the RGB values without modifying a luminance of said pixel; and
  second means for modifying the color saturation of the pixel of the image without modifying a highest of adjusted RGB values.

34. The system of claim 33 wherein the first means for modifying is configured to perform a matrix calculation as follows:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification.

35. The system of claim 33 wherein the second means for modifying is configured to:
  determine, based on pixel values of the pixel of the image, at least one of a color saturation value, luminance value and hue value corresponding to said pixel;
  determine, based on said at least one value, a saturation factor; and
  modify a color saturation level of said pixel based on said saturation factor.

36. The system of claim 33, further comprising at least one of:
  means for receiving images; and
  means for storing images.

37. A non-transitory computer-readable memory medium whose contents configure a processing device to perform a method to modify a color saturation of an image, the method comprising:
  performing a first color saturation modification of at least one pixel of an image having RGB (red, green, blue) values by adjusting each of said R, G and B values without modifying a luminance of said pixel; and
  performing a second color saturation modification of said at least one pixel by keeping a highest of said adjusted RGB values constant and modifying values of the other two adjusted RGB values.

38. The non-transitory computer-readable memory medium of claim 37 wherein performing the first color saturation modification comprises:
  performing a matrix calculation as follows:

$$\begin{bmatrix} R'_p \\ G'_p \\ B'_p \end{bmatrix} =$$

$$\begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification.

39. The non-transitory computer-readable memory medium of claim 37 wherein performing the second color saturation modification comprises:
  determining, based on pixel values of the first pixel of the image, at least one of a color saturation value, luminance value and hue value corresponding to said first pixel;
  determining, based on said at least one value, a saturation factor; and
  modifying a color saturation level of said first pixel based on said saturation factor.

40. A non-transitory computer-readable medium whose contents configure a processing device to perform a method, the method comprising:
  determining, based on pixel values of a first pixel of an image, at least two of a color saturation value, luminance value and hue value corresponding to said first pixel;
  determining, based on said at least two values, at least two corresponding maximum saturation factors;
  selecting a lowest of said at least two corresponding maximum saturation factors; and
  modifying a color saturation level of said first pixel based on said selected saturation factor.

41. The non-transitory computer-readable medium of claim 40 wherein said determining said at least two values comprises determining, based on values of said first pixel, a color saturation value, a luminance value and a hue value corresponding to said first pixel, and wherein said determining said at least two maximum saturation factors comprises determining a first maximum saturation factor based on said color saturation value, determining a second maximum saturation factor based on said hue value, and determining a third maximum saturation factor based on said luminance value.

42. The non-transitory computer-readable medium of claim 40 wherein the method comprises:
  calculating a luminance value based on RGB (red, green, blue) values of said first pixel;
  calculating a first maximum increase of said color saturation based on a highest of said RGB values and on said luminance value; and calculating a second maximum increase of said color saturation based on a lowest of said RGB values and on said luminance value, wherein modifying the color saturation level of said first pixel comprises modifying said color saturation level based on a minimum of said first and second maximum increases and said selected saturation factor.

43. The non-transitory computer-readable medium of claim 40, wherein said pixel values of said first pixel are RGB (red, green, blue) values, and wherein modifying said color saturation level comprises increasing a distance between a maximum and a minimum of said RGB values.

44. The non-transitory computer-readable medium of claim 43 wherein the method comprises performing an operation as follows:

$$b' = a - (a-b) \cdot SF_p'$$

$$c' = a - (a-c) \cdot SF_p'$$

where a, b and c are respectively a highest, intermediate and lowest of said RGB values, b' is a new value of said intermediate RGB value, c' is a new value of said lowest RGB value, and $SF_p'$ is said selected saturation factor.

45. The non-transitory computer-readable medium of claim 44 wherein the method comprises calculating a maximum saturation $SF_{max}$ according to:

$$SF_{max} = a/(a-c)$$

wherein the color saturation of said pixel is modified by applying a lowest of said saturation factor and said maximum saturation.

46. The non-transitory computer-readable medium of claim 44 wherein the method comprises, prior to performing said color saturation modification, performing a first color saturation modification of said first pixel by performing the following matrix calculation:

$$\begin{bmatrix} R_p' \\ G_p' \\ B_p' \end{bmatrix} = \begin{bmatrix} W_R + (1-W_R)xSF_p & W_G x(1-SF_p) & W_B x(1-SF_p) \\ W_R x(1-SF_p) & W_G + (1-W_G)xSF_p & W_B x(1-SF_p) \\ W_R x(1-SF_p) & W_G x(1-SF_p) & W_B + (1-W_B)xSF_p \end{bmatrix} \cdot \begin{bmatrix} R_p \\ G_p \\ B_p \end{bmatrix}$$

wherein $R_p$, $G_p$, and $B_p$ are said RGB values, $R'_p$, $G'_p$, and $B'_p$ are RGB values after said first color saturation modification, $W_R$, $W_G$ and $W_B$ are constant weighting coefficients corresponding to the R, G and B values respectively, and $SF_p$ is a saturation factor of said first color saturation modification.

47. The non-transitory computer-readable medium of claim 46 wherein the method comprises calculating the saturation factor of said first color saturation modification by:
calculating a luminance value based on RGB values of a said first pixel;
calculating a first maximum increase of said color saturation based on a highest of said RGB values and on said luminance value;
calculating a second maximum increase of said color saturation based on a lowest of said RGB values and on said luminance value; and
determining a minimum of said first and second maximum increases and the selected saturation factor.

* * * * *